(12) United States Patent
Chen et al.

(10) Patent No.: US 10,013,071 B2
(45) Date of Patent: Jul. 3, 2018

(54) THREE-DIMENSIONAL GESTURE SENSING METHOD AND TOUCH SENSING DEVICE USING THE SAME

(71) Applicant: PIXART IMAGING INC., Hsin-Chu (TW)

(72) Inventors: Yu-Han Chen, Hsin-Chu (TW); Chi-Chieh Liao, Hsin-Chu (TW); Chia-Yi Lee, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/340,847

(22) Filed: Nov. 1, 2016

(65) Prior Publication Data

US 2017/0235370 A1 Aug. 17, 2017

(30) Foreign Application Priority Data

Feb. 17, 2016 (TW) .............................. 105104572 A

(51) Int. Cl.
*G06F 3/01* (2006.01)
*G06F 3/041* (2006.01)
*G06F 3/044* (2006.01)

(52) U.S. Cl.
CPC .............. *G06F 3/017* (2013.01); *G06F 3/044* (2013.01); *G06F 3/0416* (2013.01); *G06F 2203/04101* (2013.01)

(58) Field of Classification Search
CPC ........ G06F 3/017; G06F 3/0416; G06F 3/041; G06F 3/042; G06F 3/043; G06F 3/044; G06F 3/045; G06F 3/046; G06F 3/047; G06F 2203/04101; G06F 2203/04108; G06F 2203/04112
See application file for complete search history.

(56) References Cited

U.S. PATENT DOCUMENTS

| | | | |
|---|---|---|---|
| 9,035,900 B2 * | 5/2015 | Azumi | G06F 3/044 345/174 |
| 2012/0293451 A1 * | 11/2012 | Van Schyndel | G06F 1/1643 345/174 |
| 2013/0249855 A1 | 9/2013 | Zhang | |
| 2014/0267155 A1 | 9/2014 | Aubauer et al. | |
| 2014/0375590 A1 * | 12/2014 | Cok | G06F 3/044 345/174 |
| 2015/0022494 A1 * | 1/2015 | Azumi | G06F 3/044 345/174 |
| 2017/0045966 A1 * | 2/2017 | An | G06F 3/044 |

* cited by examiner

*Primary Examiner* — Tom Sheng
(74) *Attorney, Agent, or Firm* — Li&Cai Intellectual Property (USA) Office

(57) ABSTRACT

Disclosed is a three-dimensional gesture sensing method. The three-dimensional gesture sensing method comprises the following steps. Step A: driving at least one first conductive line of conductive lines in the touch sensing device as a first working sensing line, and driving at least one second conductive line of the conductive lines in the touch sensing device as a second working sensing line, such that a sensing area is formed between the first working sensing line and the second working sensing line. Step B: detecting a conductor according to the sensing area. Step C: dynamically adjusting at least the area, the position or the amount of the sensing area according to the conductor to implement a three-dimensional gesture sensing.

27 Claims, 12 Drawing Sheets

THREE-DIMENSIONAL GESTURE SENSING METHOD AND TOUCH SENSING DEVICE USING THE SAME

BACKGROUND OF THE INVENTION

1. Field of the Invention

The instant disclosure relates to a three-dimensional gesture sensing method; in particular, to a three-dimensional gesture sensing method that can dynamically adjust sensing areas and a touch sensing device using the same.

2. Description of Related Art

In recent years, with the development of the touch sensing technology, there are more and more electric devices having the touch sensing function. A user can operate an electric device by touching or pressing a touch screen of the electric device.

The touch screen can be, for example, the resistive overlay touch screen, the photosensitive touch screen, the capacitive touch screen or the like. The working principle of the capacitive touch screen is as follows. When a user uses his finger or an article to contact the touch screen, the touch screen can transform the information of the contact position to an electric signal by detecting the capacitance variations between the conductive sensing patterns, between the adjacent sensing patterns, between the grounding electrodes or between other electric elements.

Moreover, the three-dimensional gesture sensing technology has been developed recently, by which a user can operate an electric device without directly contacting a touch screen thereof. However, currently, to implement the three-dimensional gesture sensing, there are additional conductive lines or additional light emitting elements needed to be configured in the touch screen, which increases the cost and the complexity regarding manufacturing a touch screen with the three-dimensional gesture sensing function. In addition, compared with the two-dimensional touch sensing technology, there is still room for improvement of the detection accuracy regarding the three-dimensional gesture sensing technology.

SUMMARY OF THE INVENTION

The instant disclosure provides a three-dimensional gesture sensing method. The three-dimensional gesture sensing method is used in a touch sensing device. The three-dimensional gesture sensing method comprises steps as follows. Step A: driving at least one first conductive line of the conductive lines in the touch sensing device as a first working sensing line, and driving at least one second conductive line of the conductive lines in the touch sensing device as a second working sensing line, such that a sensing area is formed between the first working sensing line and the second working sensing line. Step B: detecting a conductor according to the sensing area. Step C: dynamically adjusting at least the area, the position or the amount of the sensing area according to the conductor to implement a three-dimensional gesture sensing.

The instant disclosure further provides a touch sensing device. The touch sensing device is used to dynamically adjust at least the area, the position or the amount of the sensing area for detecting a conductor. The touch sensing device comprises a capacitive touch panel and a driving circuit. The capacitive touch panel comprises a plurality of conductive lines parallel with each other. The driving circuit is connected to the conductive lines. At a first timing, the driving circuit drives at least one first conductive line of the conductive lines as a first working sensing line and drives at least one second conductive line of the conductive lines as a second working sensing line, such that a sensing area is formed between the first working sensing line and the second working sensing line.

To sum up, the three-dimensional gesture sensing method and the touch sensing device using the same provided in the embodiments of the instant disclosure can dynamically adjust at least the area, the position or the amount of the sensing area for detecting a conductor, to implement the three-dimensional gesture sensing. Compared with the traditional three-dimensional gesture sensing method, a larger sensing region and remarkable detection accuracy are provided by the three-dimensional gesture sensing method and the touch sensing device using the same provided in the embodiments of the instant disclosure.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like reference numbers indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element from another. For example, a first element could be termed a second element, and, similarly, a second element could be termed a first element, without departing from the teachings of the instant disclosure. As used herein, the term "and/or" includes any and all combinations of one or more of the associated listed items.

Figure 1:
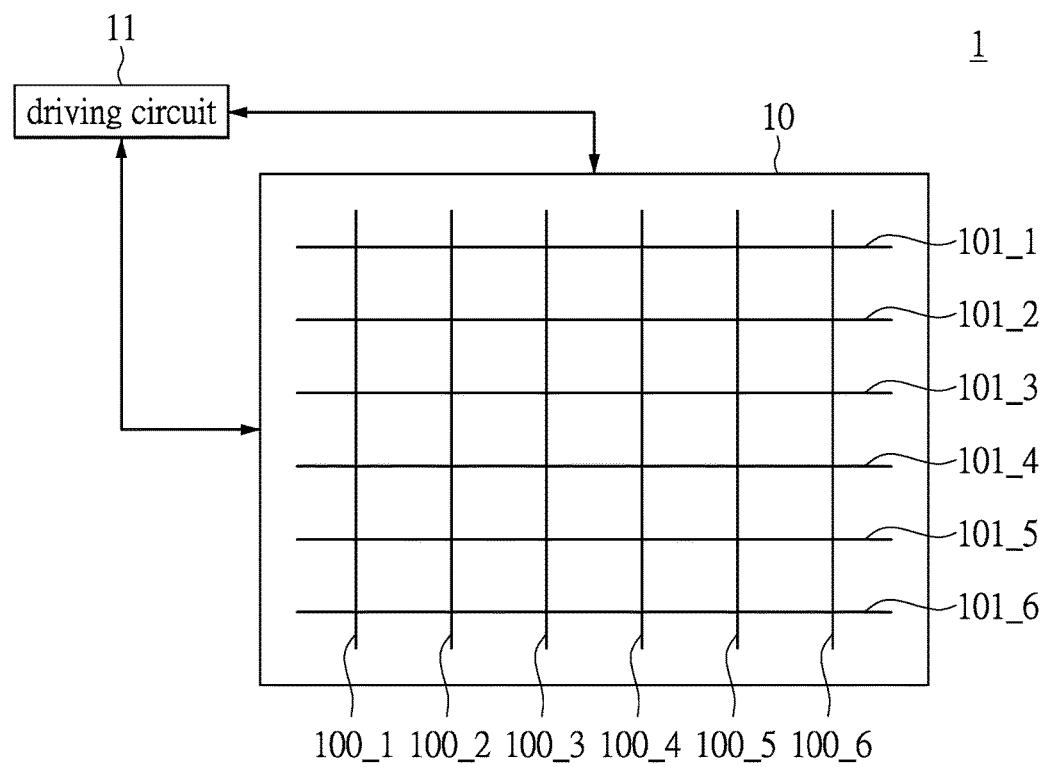
FIG. 1 shows a schematic diagram of a touch sensing device of one embodiment of the instant disclosure.

Refer to FIG. 1. FIG. 1 shows a schematic diagram of a touch sensing device of one embodiment of the instant disclosure. The touch sensing device 1 dynamically adjusts at least the area, the position or the amount of the sensing area for detecting a conductor. The touch sensing device 1 can be, for example, a smart phone, a tablet or other electric device supporting the touch sensing function. The touch sensing device 1 comprises a capacitive touch panel 10 and a driving circuit 11, and the capacitive touch panel 10 is connected to the driving circuit 11.

The capacitive touch panel 10 comprises appropriate logics, circuits and/or codes, and is configured to provide an electric field for detecting the distance between a conductor and the touch sensing device 1 to implement the three-dimensional gesture sensing. On the other hand, to implement the two-dimensional touch sensing, a conductor can directly touch the capacitive touch panel 10 in a sliding way or a pressing way. In addition, the conductor can be a user's finger or a stylus, and it is not limited herein.

The capacitive touch panel 10 comprises a plurality of conductive lines, wherein the configuration of these conductive lines is not specifically restricted, as long as there can be the sensing area formed there between. As shown in FIG. 1, the conductive lines comprise a plurality of longitudinal conductive lines 100_1-100_6 and a plurality of transverse conductive lines 101_1-101_6. The longitudinal conductive lines 100_1-100_6 are parallel with each other, and the transverse conductive lines 101_1-101_6 are also parallel with each other. It should be noted that, there are only six longitudinal conductive lines and six transverse conductive lines shown in FIG. 1. However, the number of the longitudinal conductive lines or the transverse conductive lines is not restricted herein. Those skilled in the art can design the numbers of the longitudinal conductive lines and the transverse conductive lines in the capacitive touch panel 10 depending on need. It is not a must to configure these conductive lines longitudinally and transversely. Besides, these conductive lines can be not parallel with each other, as long as there are the conductive lines set as the transmitting (or driving) lines and the receiving (or sensing) lines, such that the sensing area can be formed between the transmitting line and the receiving line.

The driving circuit 11 is connected to each conductive line of the capacitive touch panel 10. The driving circuit 11 drives at least one first conductive line of the conductive lines as a first working sensing line, such as a transmitting line, and drives at least one second conductive line of the conductive lines as a second working sensing line, such as a receiving line, such that a sensing area can be formed between the transmitting line and the receiving line. For example, the driving circuit 11 drives a longitudinal conductive line as a transmitting (or driving) line and drives a transverse conductive line as a receiving (or sensing) line, or the driving circuit 11 drives two longitudinal conductive lines as a transmitting (or driving) line and a receiving (or sensing) line respectively, or the driving circuit 11 drives two transverse conductive lines as a transmitting (or driving) line and a receiving (or sensing) line respectively.

At a first timing when the touch sensing device 1 implements the three-dimensional gesture sensing function, or when the driving circuit 11 adjusts at least the area, the position or the amount of the sensing area, the driving circuit 11 drives the conductive lines as the transmitting line and the receiving line, and thus a sensing area is formed there between. It is worth mentioning that, each conductive line can be driven as the transmitting line or the receiving line based on the control of the driving circuit 11.

Figure 2A:
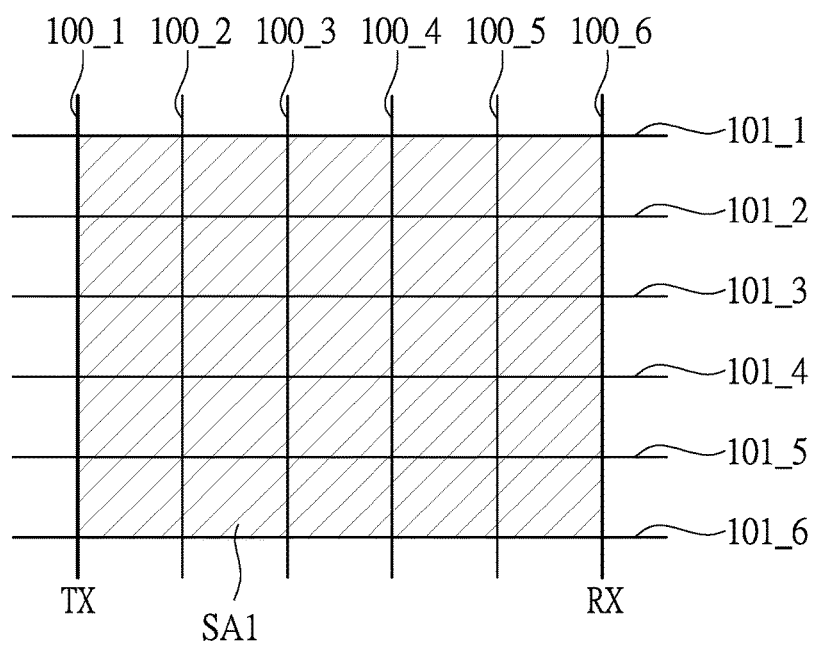
FIGS. 2A-2B show schematic diagrams of sensing areas of embodiments of the instant disclosure.
Figure 2B:
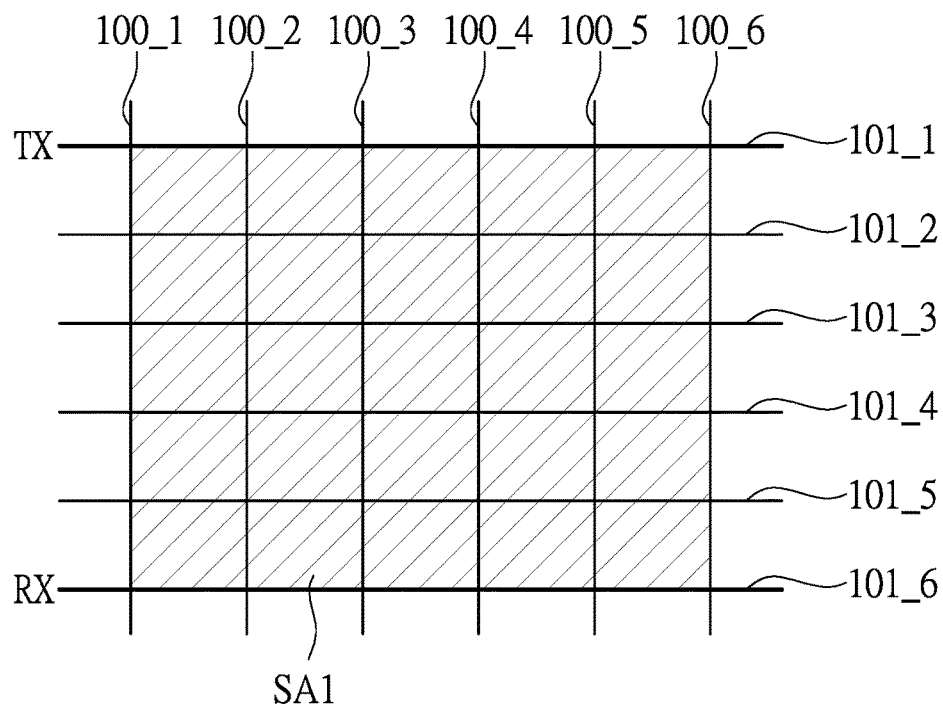
Figure 3A:
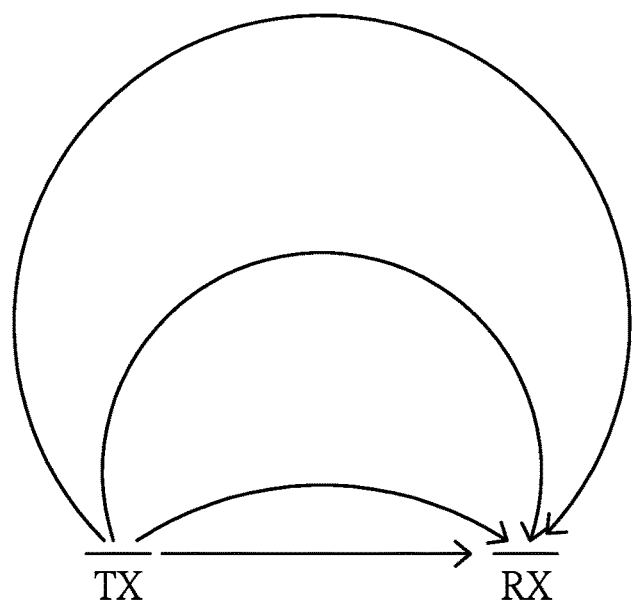
FIGS. 3A-3C show schematic diagrams of the electric field variation of a sensing area in one embodiment of the instant disclosure.
Figure 3B:
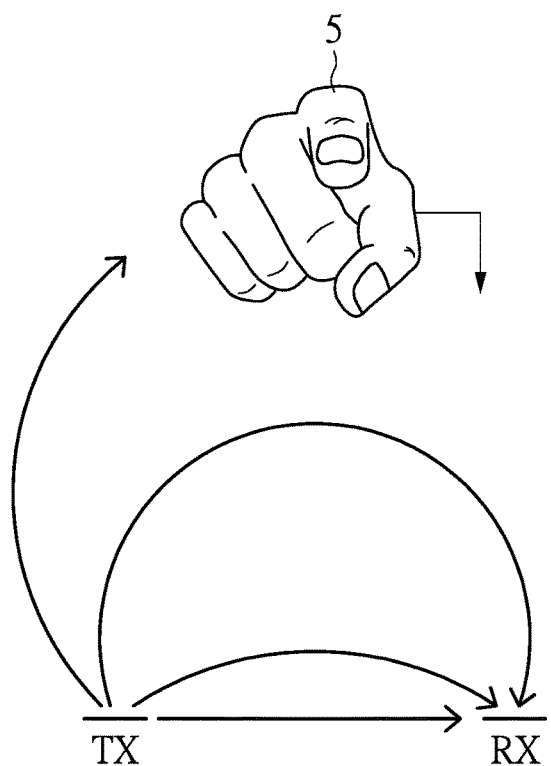
Figure 3C:
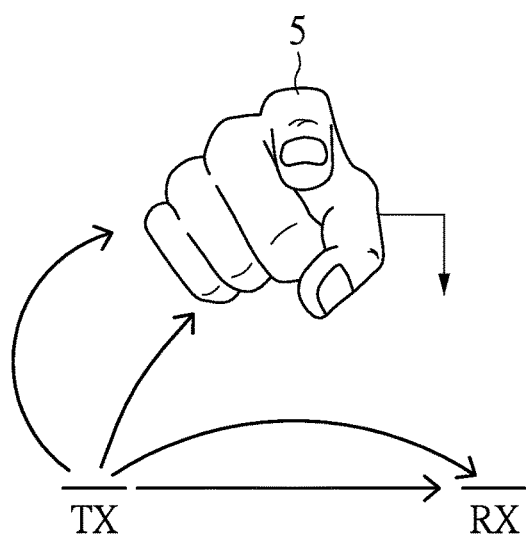

For ease of illustration, refer to FIGS. 2A-2B and 3A-3C. FIGS. 2A-2B show schematic diagrams of sensing areas of embodiments of the instant disclosure, and FIGS. 3A-3C show schematic diagrams of the electric field variation of a sensing area in one embodiment of the instant disclosure. In FIG. 2A, when implementing the three-dimensional gesture sensing, the driving circuit 11 drives the longitudinal conductive line 100_1 as a transmitting line TX, and drives the longitudinal conductive line 100_6 as a receiving line RX. An electric field shown in FIG. 3A is formed between the transmitting line TX and the receiving line RX, wherein the region of the electric field is defined as a sensing area hereinafter referred to as first sensing area SA1. It should be noted that, as a conductor approaches or enters the sensing area SA1, the electric field will change, and thus the sensing signal of the receiving line will change, as the induction and capacitance changes. Preferably, when detecting the three-dimensional gesture of a conductor, two parallel conductive lines lying on the same plane are driven as a transmitting line TX and a receiving line RX respectively, to form a larger sensing area.

As shown in FIGS. 3B-3C, as the conductor 5 approaches the capacitive touch panel 10, the electric field will change. According to the variation of the electric field, a controller (not shown) of the capacitive touch panel 10 can implement the three-dimensional gesture sensing and detect the conductor 5 that has not yet contacted the capacitive touch panel 10. The sensing region of the first sensing area SA1 is directly proportional to the distance between the transmitting line TX and the receiving line RX. The larger the distance between the transmitting line TX and the receiving line RX is, the broader the sensing region of the first sensing area SA1 would be. As described, the sensing region of the first sensing area SA1 is directly proportional to the distance between the transmitting line TX and the receiving line RX, or in other words, the sensing region of the first sensing area SA1 is directly proportional to the area of the first sensing area SA1. If the longitudinal conductive line 100_1 is driven as a transmitting line TX and the longitudinal conductive line 100_6 is driven as a receiving line RX, the first sensing area SA1 would cover the entire capacitive touch panel 10 for quickly detecting the approach of a conductor. In addition, the area of the first sensing area SA1 is large, so the conductor will be detected even when it is approaching but is not yet very close to the capacitive touch panel 10.

It is worth mentioning that, in FIG. 2A, except for the longitudinal conductive lines 100_1 and 100_6, the other conductive lines are all switched off as not-working sensing lines, so that there is no other sensing area formed between these not-working sensing lines. Also, it should be noted that, the not-working sensing lines are floated, grounded or provided with a constant voltage, such that there is no electric filed generated there between.

In this embodiment, the driving circuit 11 determines to drive the longitudinal conductive lines 100_1 and 100_6 as the transmitting line TX and the receiving line RX, but it is not limited herein. In fact, the driving circuit 11 can determine to drive any two of the longitudinal conductive lines 100_1-100_6 as the transmitting line TX and the receiving line RX, to adjust the area and/or the position of the first sensing area SA1. Moreover, the number of the transmitting lines TX and the number of the receiving lines RX are not restricted in this embodiment. The driving circuit 11 can determine to drive several conductive lines as a plurality of transmitting lines TX and a plurality of receiving lines RX, to adjust the amount of the first sensing area SA1.

If there are a plurality of sensing areas, they can be overlapped with each other or not overlapped with each other. For example, if the longitudinal conductive line 100_1 is driven as a transmitting line TX, and the longitudinal conductive lines 100_3 and 100_6 are both driven as receiving lines RX, one sensing area is formed between the longitudinal conductive lines 100_1 and 100_3 and another one sensing area is formed between the longitudinal conductive lines 100_1 and 100_6.

Additionally, in FIG. 2B, the driving circuit 11 drives the transverse conductive line 101_1 as a transmitting line TX and drives the transverse conductive line 101_6 as a receiving line RX. In this case, a first sensing area SA1 is formed between the transmitting line TX and the receiving line RX. In other words, the driving circuit 11 can arbitrarily determine to drive any two parallel conductive lines as the transmitting line TX and the receiving line RX respectively, to form a first sensing area SA1.

Figure 4:
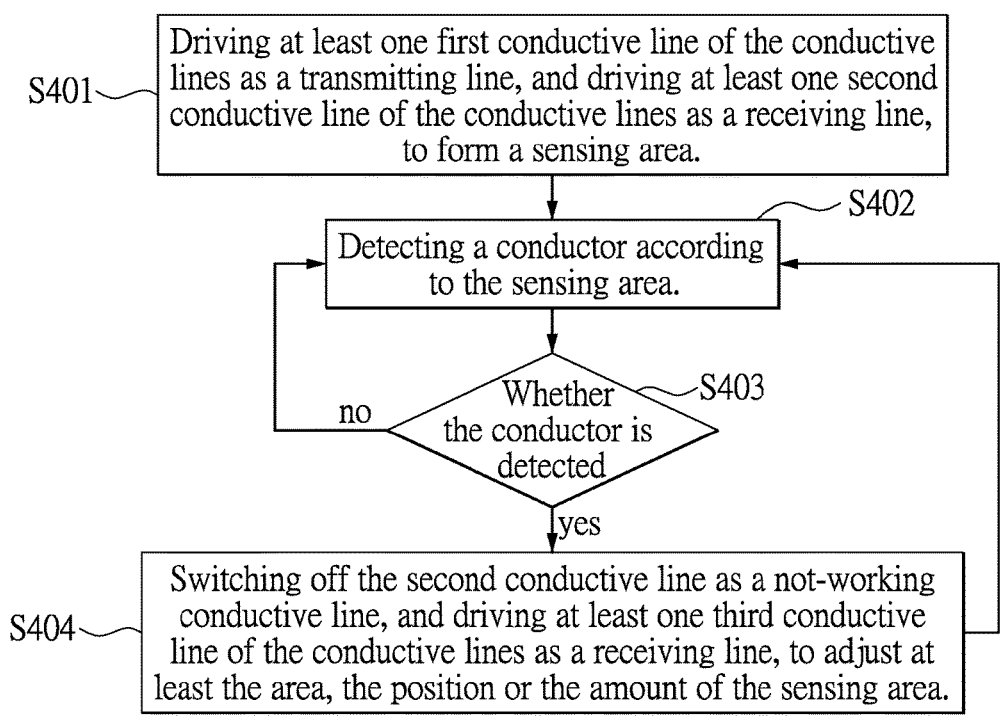
FIG. 4 shows a flow chart of a three-dimensional gesture sensing method of one embodiment of the instant disclosure.

The following description is to illustrate how the capacitive touch panel 1 implements the three-dimensional gesture sensing. Refer to FIG. 4. FIG. 4 shows a flow chart of a three-dimensional gesture sensing method of one embodiment of the instant disclosure. The three-dimensional gesture sensing method shown in FIG. 4 is used in the capacitive touch panel 1 shown in FIG. 1. In Step S401, the driving circuit 11 drives at least one first conductive line (such as the longitudinal conductive line 100_1) as a transmitting line TX, and drives at least one second conductive line (such as the longitudinal conductive line 100_2) as a receiving line RX, such that a sensing area (such as the first sensing area SA1 shown in FIG. 2A) is formed between the transmitting line TX and the receiving line RX. In Step S402, the touch sensing device 1 detects a conductor 5 according to the first sensing area SA1 by detecting the distance between the conductor 5 and the touch sensing device 1 or by detecting the movement of the conductor 5.

In Step S403, a controller of the touch sensing device 1 determines whether the conductor 5 is detected according to the first sensing area SA1. If the conductor 5 is detected in the first sensing area SA1, it goes to Step S404. Otherwise, if the conductor 5 is not detected in the first sensing area SA1, it returns to Step S402, and then a controller of the touch sensing device 1 detects and determines whether the conductor 5 is approaching the touch sensing device 1 according to the first sensing area SA1.

Figure 5A:
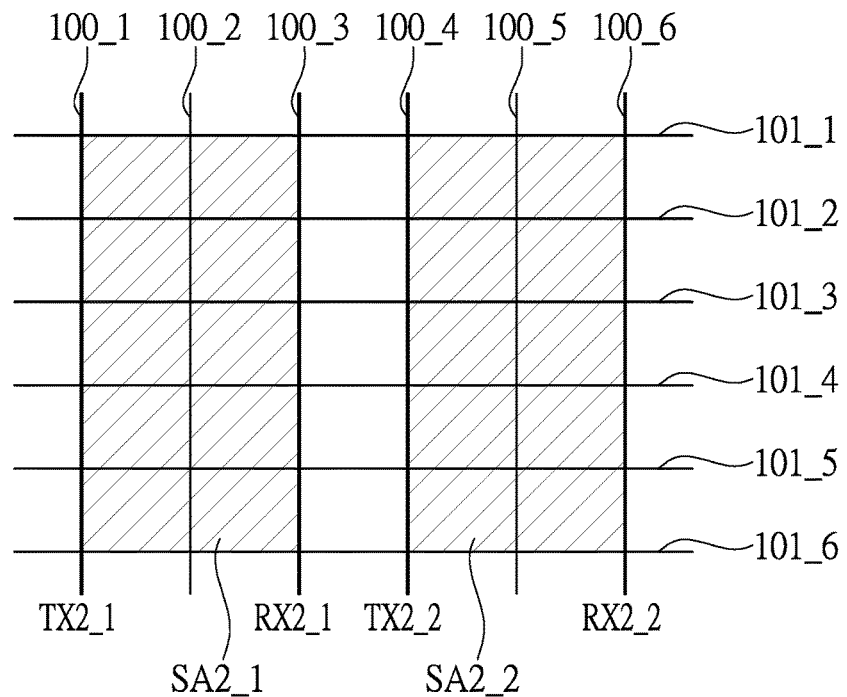
FIGS. 5A-5B show schematic diagrams of sensing areas having different areas in embodiments of the instant disclosure.
Figure 5B:
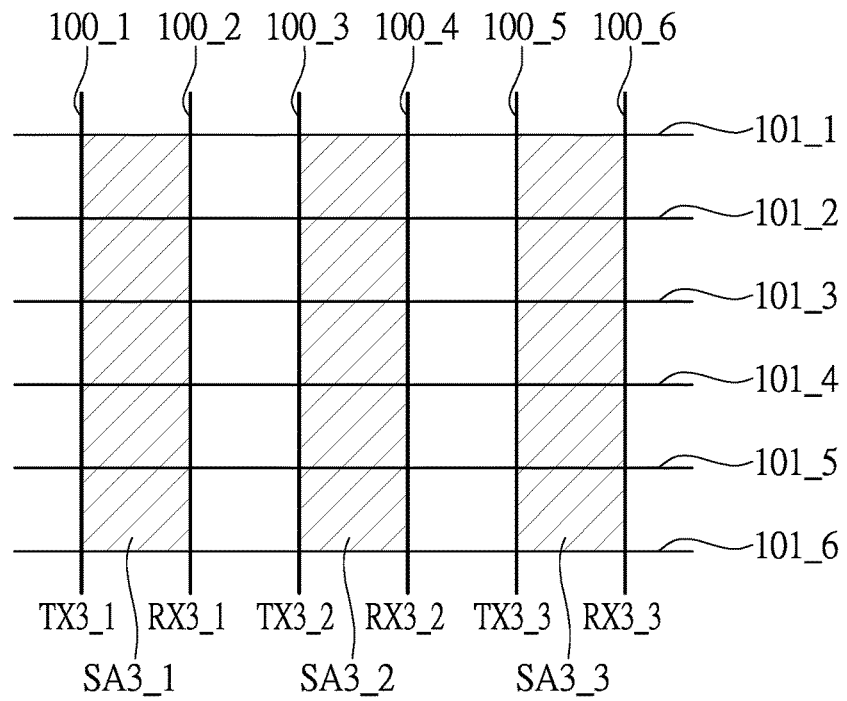

In Step S404, the controller controls the driving circuit 11 to dynamically adjust at least the area, the position or the amount of the first sensing area SA1 according to the conductor 5. The driving circuit 11 switches off the second conductive line as the not-working sensing line, and drives at least one third conductive line of the conductive lines as the receiving line, to adjust the first sensing area SA1. For ease of illustration, refer to FIGS. 5A-5B. FIGS. 5A-5B show schematic diagrams of sensing areas having different areas of embodiments of the instant disclosure. As shown in FIG. 5A, the driving circuit 11 maintains the longitudinal conductive line 100_1 as a transmitting line (thereafter referring to the first transmitting line TX2_1), and drives the longitudinal conductive line 100_3, originally being a not-working sensing line, as a receiving line (there after referring to the first receiving line RX2_1), such that a second sensing area SA2_1 is formed between the first transmitting line TX2_1 and the first receiving line RX2_1. The distance between the longitudinal conductive line 100_1 and the longitudinal conductive line 100_3 is less than the distance between the longitudinal conductive line 100_1 and the longitudinal conductive line 100_6, so the area of the second sensing area SA2_1 is smaller than the area of the first sensing area SA1 shown in FIG. 2. Also, the position of the second sensing area SA2_1 is different from the position of the first sensing area SA1 shown in FIG. 2.

On the other hand, the driving circuit 11 can drive and then maintain the longitudinal conductive line 100_6 as a receiving line (thereafter referring to the second receiving line RX2_2), and drive the longitudinal conductive line 100_4, originally being a not-working sensing line, as a transmitting line (thereafter referring to the second transmitting line TX2_2). As a result, a second sensing area SA2_2 is formed between the second transmitting line TX2_2 and the second receiving line RX2_2. The distance between the longitudinal conductive line 100_1 and the longitudinal conductive line 100_3 is equal to the distance between the longitudinal conductive line 100_4 and the longitudinal conductive line 100_6, so the area of the second sensing area SA2_1 is equal to the area of the second sensing area SA2_2. In addition, compared with the FIG. 2A, the touch sensing device 1 has two sensing areas.

Moreover, the driving circuit 11 can also switch off the longitudinal conductive line 100_6 as a not-working sensing line, and maintains the longitudinal conductive line 100_4 as the not-working sensing line. As a result, the touch sensing device 1 has only one second sensing area SA2_1 left.

After that, it returns to Step S402. The touch sensing device 1 detects the conductor 5 according to the adjusted sensing area SA, which is currently the second sensing area SA2_1 and the second sensing area SA2_2. Likewise, when the conductor 5 is detected in the second sensing area SA2_1 or the second sensing area SA2_2, the driving circuit 11 can further adjust at least the area, the position or the amount of the second sensing areas SA2_1 and SA2_2. Specifically speaking, the driving circuit 11 maintains the longitudinal conductive line 100_1 as the transmitting line (thereafter referring to the first transmitting line TX3_1), and drives the longitudinal conductive line 100_2, originally being a not-working sensing line, as a receiving line (thereafter referring to the first receiving line RX3_1), such that a third sensing area SA3_1 is formed between the first transmitting line TX3_1 and the first receiving line RX3_1. The area of the third sensing area SA3_1 is smaller than the area of the above described sensing area SA and the area of the above described second sensing areas SA2_1 and SA2_2.

Additionally, the driving circuit 11 drives the longitudinal conductive line 100_3 as a transmitting line (thereafter referring to the second transmitting line TX3_2) and drives the longitudinal conductive line 100_4, originally being a not-working sensing line, as a receiving line (thereafter referring to the second receiving line RX3_2), such that a third sensing area SA3_2 is formed between the second transmitting line TX3_2 and the second receiving line RX3_2.

The driving circuit 11 further drives the longitudinal conductive line 100_5, originally being the not-working sensing line, as a transmitting line (thereafter referred to as the transmitting line TX3_3), and maintains the longitudinal conductive line 100_6 as the receiving line (thereafter referred to as the receiving line RX3_3), such that a third sensing area SA3_3 is formed between the transmitting line TX3_3 and the receiving line RX3_3. The driving circuit 11 detects the conductor 5 according to the third sensing areas SA3_1, SA3_2 and SA3_3.

Once the conductor 5 contacts the capacitive touch panel 10, the driving circuit 11 ends the above described three-dimensional gesture sensing method, and starts a two-dimensional gesture sensing method for implementing the two-dimensional touch sensing. It should be noted that, the two-dimensional gesture sensing technology should be easily understood by the skilled in the art, and thus it is unnecessary to illustrate the details herein.

Figure 6:
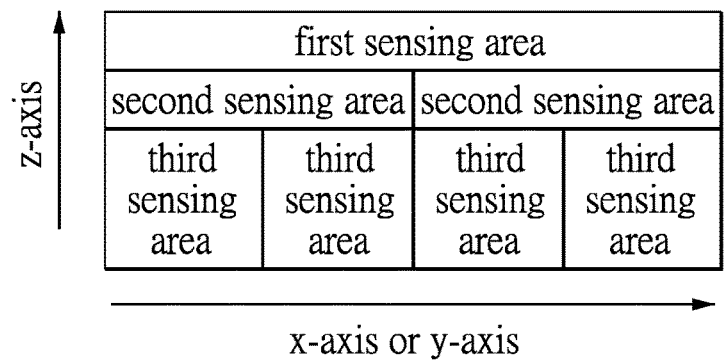
FIG. 6 shows a schematic diagram of a sensing region of each sensing area of one embodiment of the instant disclosure.

Refer to FIG. 6. FIG. 6 shows a schematic diagram of a sensing region of the sensing areas of one embodiment of the instant disclosure. From the above, it can be known that, the sensing region of the sensing area is directly proportional to the distance between the transmitting line and the receiving line (that is, the area of the sensing area). Thus, the relative sizes of the area of the first sensing area SA1 shown in FIG. 2A, the area of the second sensing areas SA2_1 and SA2_2 shown in FIG. 5A and the area of the third sensing areas SA3_1, SA3_2 and SA3_3 shown in FIG. 5B can be represented as FIG. 6. As shown in FIG. 6, the area of the first sensing area SA1 is larger than the area of the second sensing areas SA2_1 and SA2_2, and is also larger than the area of the third sensing areas SA3_1, SA3_2 and SA3_3. Compared with the other sensing areas, along the z-axis, the sensing region of the first sensing area SA1 is farthest away from the capacitive touch panel 10. Also, the area of the second sensing areas SA2_1 and SA2_2 is larger than the area of the third sensing areas SA3_1, SA3_2 and SA3_3. Along the z-axis, the sensing region of the second sensing areas SA2_1 and SA2_2 is farther away from the capacitive touch panel 10 than the sensing region of the third sensing areas SA3_1, SA3_2 and SA3_3.

In other words, if the conductor 5 is detected within the second sensing area SA2_1 or SA2_2, but is not detected within the third sensing area SA3_1, SA3_2 or SA3_3, it indicates that, along the z-axis, the conductor 5 is farther away from the capacitive touch panel 10 (that is, the distance between the conductor and the capacitive touch panel 10 is large). On the other hand, if the conductor 5 is detected within the second sensing area SA2_1 or SA2_2 and is detected within the third sensing area SA3_1, SA3_2 or SA3_3, it indicates that, along the z-axis, the conductor 5 is close to the capacitive touch panel 10 (that is, the distance between the conductor and the capacitive touch panel 10 is small).

In addition, the sensing areas can extend along the x-axis or the y-axis, and it is not limited herein. For example, if a sensing area is formed based on the control of the driving circuit 11 as shown in FIG. 2A, the sensing area will extend along the x-axis. If a sensing area is formed based on the control of the diving circuit 11 as shown in FIG. 2B, the sensing area will extend along the y-axis.

It is worth mentioning that, the detection accuracy is inversely proportional to the area of the sensing area. Compared with the first sensing area SA1, in the second sensing areas SA2_1 and SA2_2, and in the third sensing areas SA3_1, SA3_2 and SA3_3, the position and the movement of the conductor 5 will be detected much more accurately. In addition, the area of the third sensing areas SA3_1, SA3_2 and SA3_3 is smaller than the area of the first sensing area SA1, but the position and the movement of the conductor 5 will be detected much more accurately in the third sensing areas SA3_1, SA3_2 and SA3_3.

Thus, according to the relative position of the conductor 5 and the touch sensing device 1, by adjusting at least the area, the position or the amount of the sensing area, the touch sensing device in this embodiment can provide a proper sensing region and remarkable detection accuracy. If the conductor 5 is approaching but is not yet close to the capacitive touch panel 10, the touch sensing device 1 will enlarge the sensing region to detect the conductor 5. If the conductor 5 is close to the capacitive touch panel 10, the touch sensing device 1 will shrink the sensing region to increase the detection accuracy.

Figure 7:
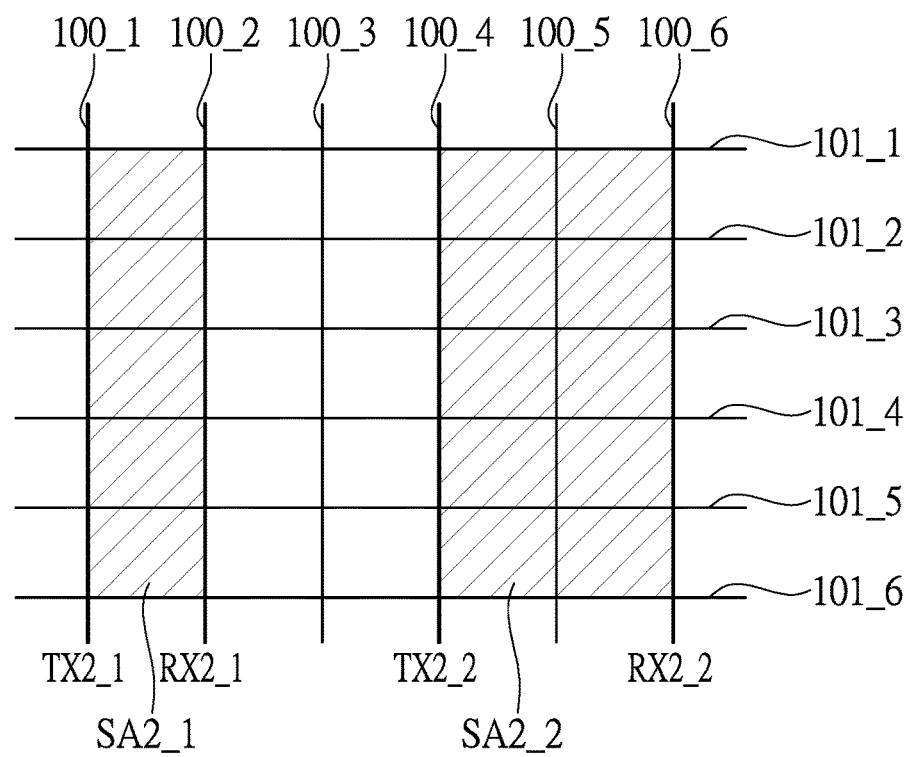
FIG. 7 shows a schematic diagram of sensing areas of another embodiment of the instant disclosure.

In other embodiments, the touch sensing device 1 can adjust at least the area, the position or the amount of only part of the sensing areas. In conjunction with FIG. 5A and FIG. 7, FIG. 7 shows a schematic diagram of sensing areas of another embodiment of the instant disclosure. First, the driving circuit 11 drives the conductive lines to form the second sensing areas SA2_1 and SA2_2 as shown in FIG. 5A.

After that, once a conductor 5 is detected in one of the sensing areas, such as the second sensing area SA2_1, the driving circuit 11 then shrinks the area of the second sensing area SA2_1 to increase the detection accuracy. Meanwhile, the driving circuit 11 maintains the area and the position of the other sensing area, which herein refers to the second sensing area SA2_2.

In another embodiment, once the conductor 5 has stayed in the second sensing area SA2_1 over a predetermined time, the driving circuit 11 removes the second sensing area SA2_2 and rearranges the conductive lines by driving them as the transmitting line or the receiving line, or switching them off as the not-working conductive lines, such that a plurality of the third sensing areas SA3_1, SA3_2 and SA3_3 is formed as shown in FIG. 5B.

Figure 8:
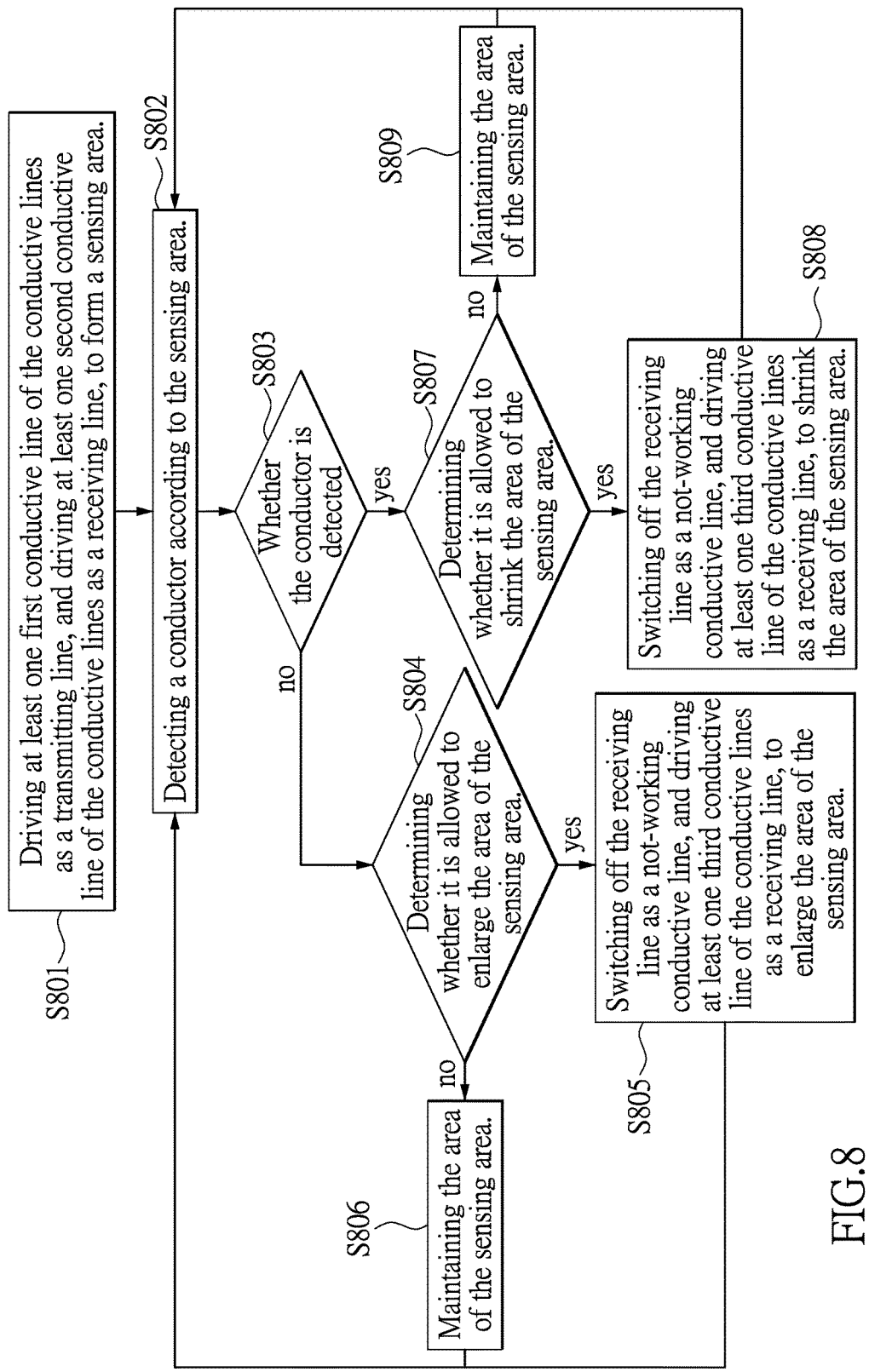
FIG. 8 shows a flow chart of a three-dimensional gesture sensing method of another embodiment of the instant disclosure.
Figure 10A:
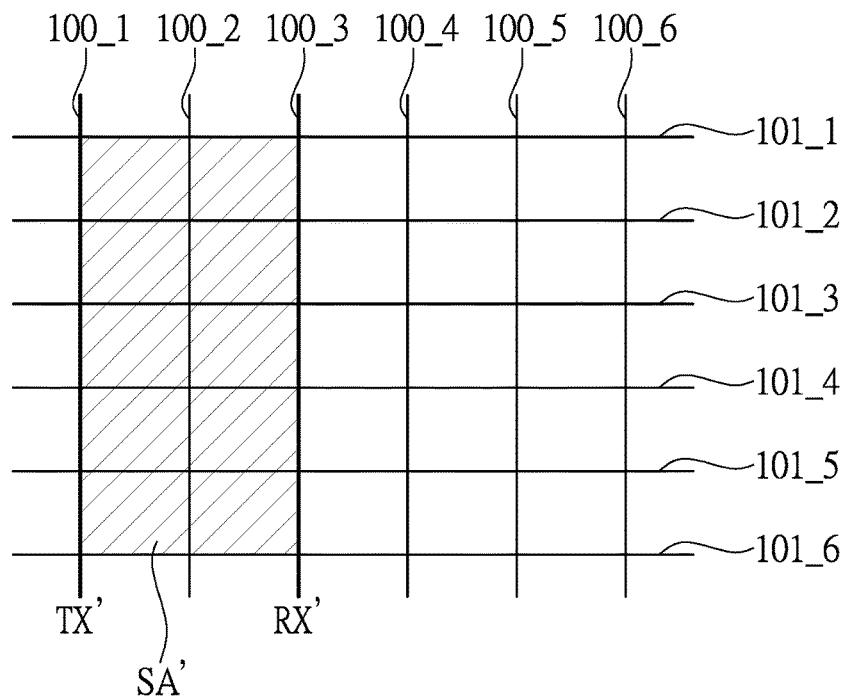
FIGS. 10A-10C show schematic diagrams of the variation of a sensing area of another embodiment of the instant disclosure.
Figure 10B:
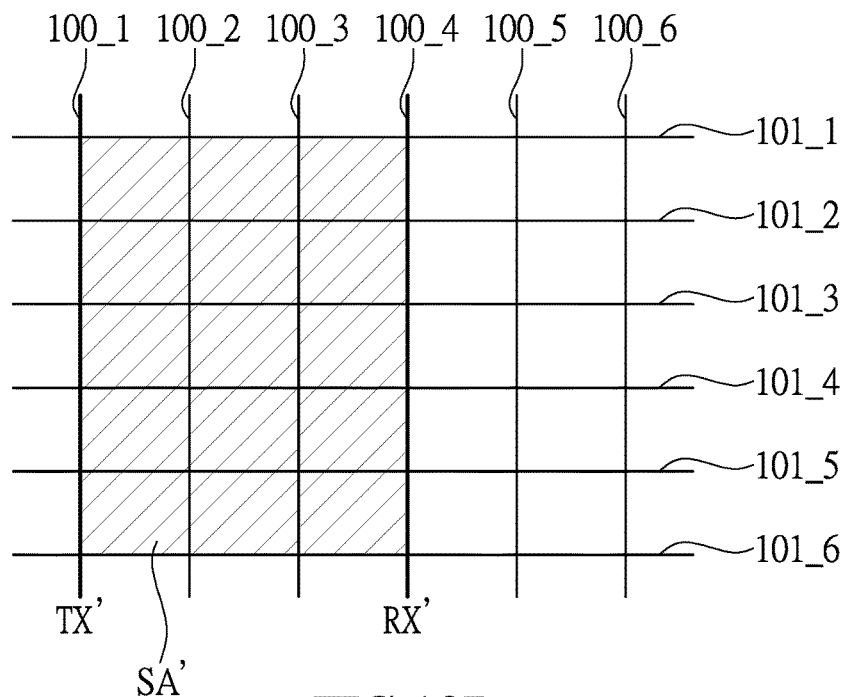

Refer to FIGS. 8, 10A and 10B. FIG. 8 shows a flow chart of a three-dimensional gesture sensing method of another embodiment of the instant disclosure. FIGS. 10A-10B show schematic diagrams of the variation of a sensing area of another embodiment of the instant disclosure. The three-dimensional gesture sensing method shown in FIG. 8 can also be used in the touch sensing device 1 shown in FIG. 1. In Step S801, the driving circuit 11 drives at least one first conductive line of the conductive lines, such as the longitudinal conductive line 100_1, as a transmitting line TX', and drives at least one second conductive line of the conductive lines, such as the longitudinal conductive line 100_3, as a receiving line RX', such that a sensing area SA' shown in FIG. 10A is formed. In Step S802, the touch sensing device 1 detects the conductor, such as the conductor 5 shown in FIG. 3B, according to the sensing area SA'.

In Step S803, a controller of the touch sensing device 1 determines whether the conductor 5 is detected according to the sensing area SA'. If the conductor 5 is not detected according to the sensing area SA', it goes to Step S804. Otherwise, if the conductor 5 is detected according to the sensing area SA', it goes to Step S807.

In Step S804, the driving circuit 11 determines whether the area of the sensing area SA' can be enlarged. If the driving circuit 11 determines to enlarge the area of the sensing area SA', it goes to Step S805. Otherwise, if the driving circuit 11 determines not to enlarge the area of the sensing area SA', it goes to Step S806.

In Step S805, at a second timing, the driving circuit 11 switches off the second conductive line, such as the longitudinal conductive line 100_3, as a not-working sensing line, and drives at least one third conductive line of the conductive lines, such as the longitudinal conductive line 100_4, as a receiving line RX'. As a result, a sensing area SA' shown in FIG. 10B is formed between the transmitting line TX' and the receiving line RX'. The second timing refers to the moment after the conductor 5 has been detected in the sensing area SA' of the touch sensing device 1 shown in FIG. 10A for a predetermined time. The area of the sensing area SA' is enlarged, because the distance between the longitudinal conductive line 100_4 and the longitudinal conductive line 100_1 is larger than the distance between the longitudinal conductive line 100_3 and the longitudinal conductive line 100_1. After that, it returns to Step S802, and the touch sensing device 1 continues to detect the conductor 5 according to the adjusted sensing area SA'. In Step S806, the driving circuit 11 maintains the area of the sensing area SA', and then it returns to Step S802. In Step S802, the touch sensing device 1 continues to detect the conductor 5 according to the maintained sensing area SA'.

With respect to the embodiment shown in FIG. 10B, each time when a predetermined time has passed, the driving circuit 11 repeats Steps S802-S805 to enlarge the area of the sensing area SA'. Once the driving circuit 11 drives the longitudinal conductive line 100_6 as a receiving line RX', the driving circuit 11 determines that the area of the sensing area SA' cannot be enlarged anymore. Then, the driving circuit 11 detects the conductor 5 according to the sensing area SA' formed between the longitudinal conductive line 100_1 and the longitudinal conductive line 100_6.

It should be noted that, when the sensing area SA' needs to be enlarged, the area increase of the sensing area SA' is not restricted in the instant disclosure, as long as the area of the sensing area SA' is enlarged. The configuration of the driving circuit 11 can be designed by those skilled in the art depending on need to adjust the area of the sensing area SA'.

In Step S807, the driving circuit 11 determines whether the area of the sensing area SA' can be shrunk. If the area of the sensing area SA' can be shrunk, it goes to Step S808. Otherwise, if the sensing area SA' cannot be shrunk, it goes to Step S809.

In Step S808, the driving circuit 11 switches off the receiving line RX', such as the longitudinal conductive line 100_3, as a not-working sensing line, and drives at least one third conductive line of the conductive lines, such as the longitudinal conductive line 100_2, as a receiving line RX' to shrink the area of the sensing area SA'. As a result, the area of the sensing area SA' shrinks, because the distance between the longitudinal conductive line 100_2 and the longitudinal conductive line 100_3 is less than the distance between the longitudinal conductive line 100_3 and the longitudinal conductive line 100_1. After that, it returns to Step S802, and the touch sensing device 1 continues to detect the conductor 5 according to the shrunk sensing area SA'. On the other hand, in Step S809, the driving circuit 11 maintains the area of the sensing area SA', and then it returns to Step S802. In Step S802, the touch sensing device 1 continues to detect the conductor 5 according to the maintained sensing area SA'.

With respect to the embodiment shown in FIG. 10A, if the conductor 5 is detected, the driving circuit will repeat Steps S803 and S807-S808, and will shrink the area of the sensing area SA'. Once the driving circuit 11 drives the longitudinal conductive line 100_2 as a receiving lines RX', the driving circuit 11 determines that the area of the sensing area SA' cannot be shrunk anymore. Then, the driving circuit 11 detects the conductor 5 according to the sensing area SA' formed between the longitudinal conductive line 100_1 and the longitudinal conductive line 100_2.

It should be noted that, when the sensing area SA' needs to be shrunk, the area decrease of the sensing area SA' is not restricted in the instant disclosure, as long as the area of the sensing area SA' is shrunk. The configuration of the driving circuit 11 can be designed by those skilled in the art depending on need to adjust the area of the sensing area SA'.

Thereby, even having not detected the conductor 5, the touch sensing device 1 can dynamically adjust the area of the sensing area SA' to increase the sensing region. If the touch sensing device 1 has a plurality of sensing areas SA', the driving circuit 11 can also dynamically increase the area of each sensing area SA'.

Figure 9:
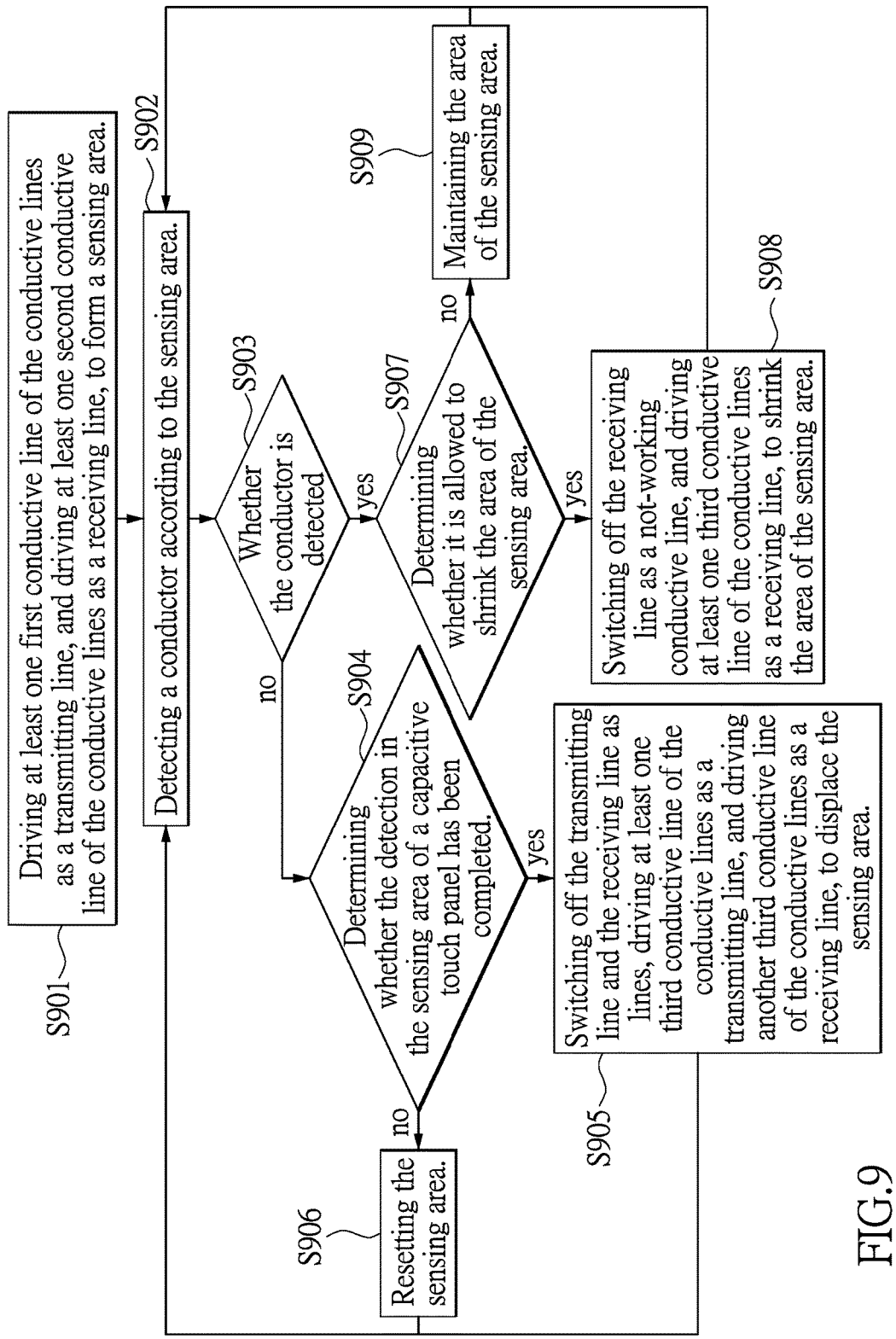
FIG. 9 shows a flow chart of a three-dimensional gesture sensing method of still another embodiment of the instant disclosure.
Figure 10C:
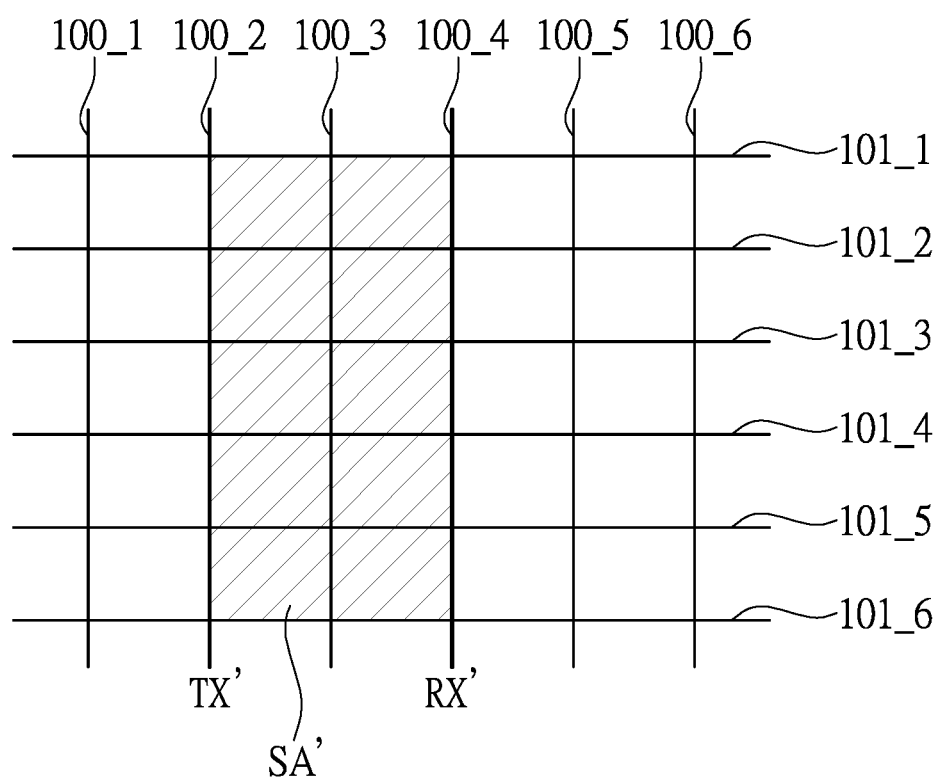

In conjunction with FIGS. 9, 10A and 10C, FIG. 9 shows a flow chart of a three-dimensional gesture sensing method of still another embodiment of the instant disclosure, and FIGS. 10A and 10C show schematic diagrams of the variation of a sensing area of another embodiment of the instant disclosure. The three-dimensional gesture sensing method shown in FIG. 9 can be also used in the touch sensing device 1 shown in FIG. 1. The Steps S901 and S902 are similar to Steps S801 and 802 shown in FIG. 8, and thus the information is not repeated. In Step S903, a controller of the touch sensing device 1 determines whether a conductor 5 is detected according to the sensing area SA'. If the conductor 5 is not detected in the sensing area SA', it goes to Step S904. On the other hand, if the conductor 5 is detected in the sensing area SA', it goes to Step S907.

In Step S904, the driving circuit 11 determines whether the detection in the sensing area SA' of the capacitive touch panel 10 has been completed. If the detection in the sensing area SA' of the capacitive touch panel 10 has not yet been completed, it goes to Step S905. Otherwise, if the detection in the sensing area SA' of the capacitive touch panel 10 has been completed, it goes to Step S906.

In Step S905, at a third timing, the driving circuit 11 switches off the transmitting line TX', such as the longitudinal conductive line 100_1, and the receiving line RX', such as the longitudinal conductive line 100_3, as two not-working sensing lines. Meanwhile, the driving circuit 11 drives at least one third conductive line of the conductive lines, such as the longitudinal conductive line 100_2, as a transmitting line TX' and drives another third conductive line of the conductive lines, such as the longitudinal conductive line 100_4, as a receiving line RX'. As a result, a sensing area SA' shown in FIG. 10C is formed between the transmitting line TX' and the receiving line RX', wherein the transmitting line TX' and the receiving line RX' are different. The third timing refers to the moment after the conductor 5 has been detected in the sensing area SA' of the touch sensing device 1 shown in FIG. 10A for a predetermined time. The distance between the longitudinal conductive line 100_4 and the longitudinal conductive line 100_2 is equal to the longitudinal conductive line 100_3 and the longitudinal conductive line 100_1, and thus the area of the sensing are SA' is maintained but the position of the sensing area SA' is adjust by the driving circuit 11. After that, it returns to Step S902. In Step S902, the touch sensing device 1 continues to detect the conductor 5 according to the displaced sensing area SA'.

In Step S906, the driving circuit 11 resets the position of the sensing area SA', such that the sensing area SA' returns to the original position, wherein the original position is, for example, the position shown in FIG. 10A. After that, it returns to Step S902. In Step S902, the capacitive touch panel 10 again detects the conductor 5.

With respect to the embodiment shown in FIG. 10C, each time when a predetermined time has passed, the driving circuit 11 repeats Steps S902-S905 to displace the position of the sensing area SA'. When the deriving circuit 11 drives the longitudinal conductive line 100_4 as the transmitting line TX' and drives the longitudinal conductive line 100_6 as the receiving line RX', the driving circuit 11 determines that the sensing area SA' cannot be displaced more toward to the longitudinal conductive line 100_6. As a result, the driving circuit 11 resets the position of the sensing area SA', so the sensing area SA' returns to the original position shown in FIG. 10A.

It should be noted that, when the sensing area SA' needs to be displaced, the displacement and the orientation of the displacement of the sensing area SA' are not restricted herein, as long as the position of the sensing area SA' is changed. The configuration of the driving circuit 11 can be designed by those skilled in the art depending on need, to adjust the position of the sensing area SA'.

In Step S907, the driving circuit 11 determines whether the area of the sensing area SA' can be shrunk. If the area of the sensing area SA' can be shrunk, it goes to Step S908. Otherwise, if the area of the sensing area SA' cannot be shrunk anymore, it goes to Step S909. The Steps S908-S909 are similar to Steps S808-809, and thus the information is not repeated. In brief, the driving circuit 11 shrinks the area of the sensing area SA' according to the relative position of the conductor 5 and the touch sensing device 1, and continues to detect the conductor 5 according to the displaced and shrunk sensing area SA'.

Thereby, even having not yet detected the conductor 5, the touch sensing device 1 can dynamically adjust the position of the sensing area SA', to detect the conductor 5 from different orientations. The position of the sensing area SA' has continually been changed, so the touch sensing device 1 may choose to decrease the amount of the sensing areas SA' to reduce the power consumption. If the touch sensing device 1 has a plurality of sensing areas SA', the driving circuit 11 can also dynamically adjust the position of each sensing area SA'. Moreover, in other embodiments, to detect the conductor 5, the driving circuit 11 can also enlarge the area of the sensing area SA' when displacing the sensing area SA'.

Figure 11A:
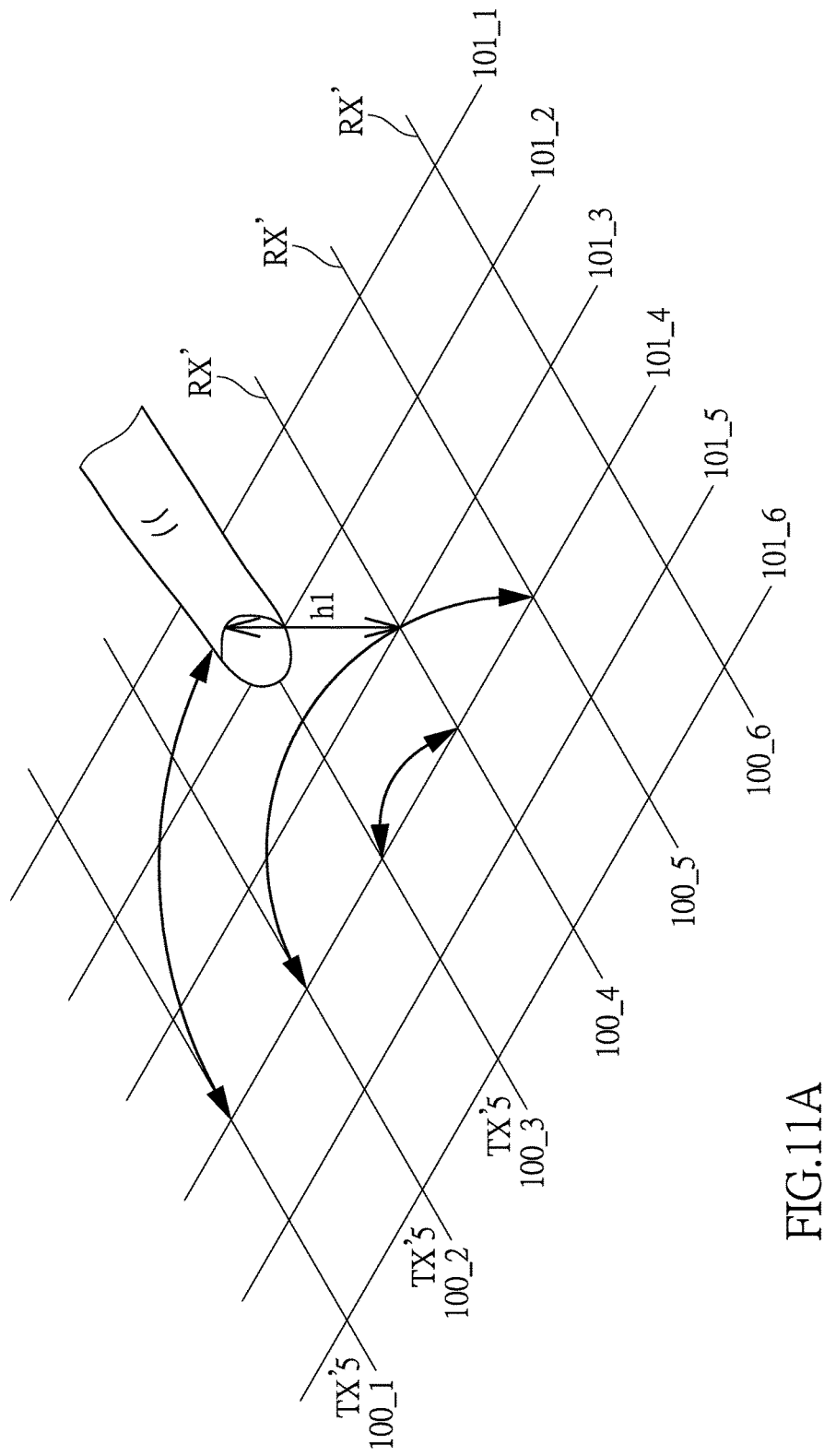
FIGS. 11A-11B are schematic diagrams showing how to detect a distance between the conductor and the capacitive touch panel in other embodiments of the instant disclosure.
Figure 11B:
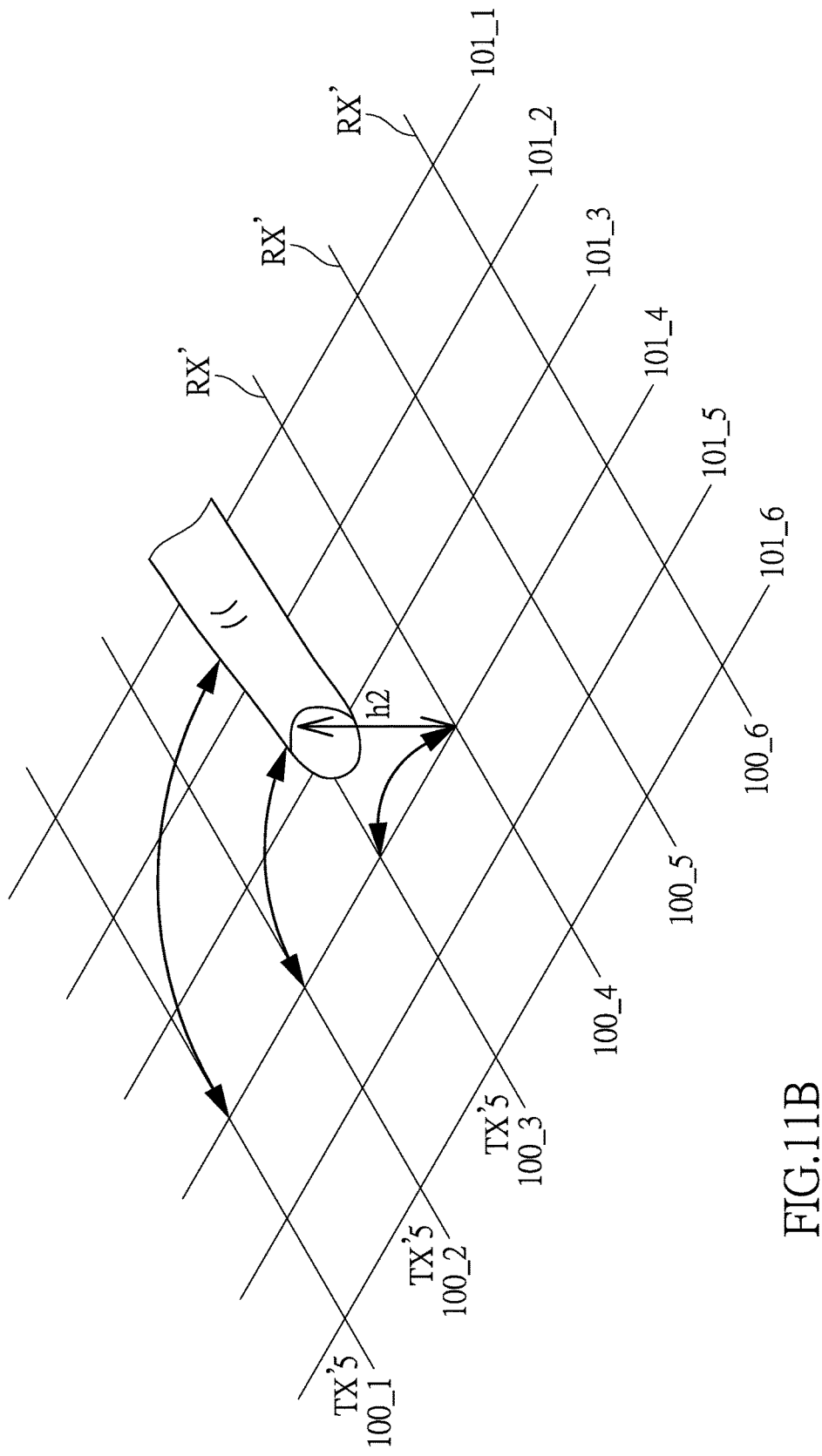

It is worth mentioning that, in the above embodiments, each time when the conductor 5 is detected within the sensing area SA', the driving circuit 11 drives the conductive lines at one side of the center of all conductive lines as the first working sensing lines and drives the conductive lines at another side of the center of all conductive lines as the second working sensing lines, to continually detect the conductor. Specifically speaking, referring to FIG. 11A and FIG. 11B, FIGS. 11A-11B are schematic diagrams showing how to detect a distance between the conductor and the capacitive touch panel in other embodiments of the instant disclosure. As shown in FIG. 11A and FIG. 11B, the conductive lines 100_1-100_3 at one side of the center of all conductive lines 100_1-100_6 are driven as the first working sensing lines, and the conductive lines 100_4-100_6 at another side of the center of all conductive lines 100_1-100_6 are driven as the second working sensing lines. For example, the conductive lines 100_1 and 100_6 forms a sensing area, the conductive lines 100_2 and 100_5 forms a sensing area, and the conductive lines 100_3 and 100_4 forms a sensing area, and these sensing areas have different areas. In addition, each sensing area has a corresponding height range limitation for sensing, for each sensing area object cannot be detected if the object is behind the corresponding height range limitation. That is to say, when the conductor 5 is sensed by one of the above sensing areas at a sensing height, the sensing height must be within the corresponding height range of that sensing area.

Thereby, the touch sensing device 1 can obtain the distance between the conductor and the capacitive touch panel 10 by determining which second working sensing line detects a signal change. As shown in FIG. 11A, if the second working sensing line 100_6 detects a signal change, but the second working sensing line 100_5 does not detect a signal change, touch sensing device 1 can obtain the distance between the conductor 5 and the capacitive touch panel 10. The conductor 5 may be moving, and thus as shown in FIG. 11B, if the conductor 5 is approaching the capacitive touch panel 10, the touch sensing device 1 determines that a signal change is detected by both the second working sensing lines 100_6 and 100_5 and accordingly obtains the distance between the conductor 5 and the capacitive touch panel 10. As shown in FIG. 11A and FIG. 11B, the distance h1 is larger than the distance h2. In other words, the if the second working sensing line detecting a signal change is close to the center of all conductive lines, the distance between the conductor 5 and the capacitive touch panel 10 would be short.

From the above, the touch sensing device 1 can determine that the conductor 5 is approaching or leaving the capacitive touch panel 10 by determining that which second working sensing line detects a signal change. When the conductor 5 is leaving the capacitive touch panel 10, the touch sensing device 1 enlarges the sensing area SA' to continually detect the conductor 5. On the other hand, when the conductor 5 is approaching the capacitive touch panel 10, the touch sensing device 1 decreases the sensing area SA' to improve detection accuracy.

To sum up, the three-dimensional gesture sensing method and the touch sensing device using the same provided in the embodiments of the instant disclosure can dynamically adjust at least the area, the position or the amount of the sensing area for detecting a conductor, to implement the three-dimensional gesture sensing. Compared with the traditional three-dimensional gesture sensing method, a larger sensing region and remarkable detection accuracy are provided by the three-dimensional gesture sensing method and the touch sensing device using the same provided in the embodiments of the instant disclosure.

Moreover, to form the sensing area for detecting a conductor, there is no additional element or conductive line needed to be configured in the three-dimensional gesture sensing device provided in the instant disclosure. The sensing area can be easily formed by driving the conductive lines as the transmitting line and the receiving line by the driving circuit. Therefore, compared with the traditional three-dimensional gesture sensing, the three-dimensional gesture sensing provided by the instant disclosure can be manufactured more easily with a lower cost.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A three-dimensional gesture sensing method, used in a touch sensing device, comprising:

step A: driving at least one first conductive line of conductive lines parallel with each other in the touch sensing device as a first working sensing line, and driving at least one second conductive line of the conductive lines in the touch sensing device as a second working sensing line, such that a sensing area is formed between the first working sensing line and the second working sensing line;

step B: detecting a conductor according to the sensing area; and step C: dynamically adjusting at least the area, the position or the amount of the sensing area according to the conductor to implement a three-dimensional gesture sensing.

2. The three-dimensional gesture sensing method according to claim 1, wherein the step C further comprises:
step C-1: switching off the second conductive line as a not-working sensing line at a second timing, and driving at least one third conductive line of the conductive lines as the second working sensing line, to adjust the area of the sensing area; and
detecting the conductor according to the adjusted sensing area.

3. The three-dimensional gesture sensing method according to claim 2, wherein the not-working sensing line is floated, grounded or provided with a constant voltage.

4. The three-dimensional gesture sensing method according to claim 2, wherein, in the step C-1, the distance between the third conductive line and the first conductive line is larger than the distance between the second conductive line and the first conductive line, such that the area of the sensing area is enlarged.

5. The three-dimensional gesture sensing method according to claim 2, wherein the step C further comprises:
step C-3: switching off the second working sensing line as the not-working sensing line, and driving at least one third conductive line of the conductive lines as the second working sensing line when the conductor is detected, to shrink the area of the sensing area, wherein the distance between the third conductive line and the first conductive line is less than the distance between the second conductive line and the first conductive line; and
step C-4: detecting the conductor according to the shrunk sensing area.

6. The three-dimensional gesture sensing method according to claim 5, step C further comprises:
step C-5: when again detecting the conductor, driving the conductive lines at one side of the center of all conductive lines as the first working sensing lines and driving the conductive lines at another side of the center of all conductive lines as the second working sensing lines, to continually detect the conductor; and
step C-6: determining which second working sensing lines detect a signal change, and accordingly obtaining a distance between the conductor and the touch sensing device;
wherein if the second working sensing line detecting the signal change is near the center of all conductive lines, the distance between the conductor and the touch sensing device is short.

7. The three-dimensional gesture sensing method according to claim 1, wherein the step C further comprises:
step C-1': at a third timing, switching off the first working sensing line and the second working sensing line as the not-working sensing lines, driving at least one third conductive line of the conductive lines as the first working sensing line, and driving at least another one third conductive line of the conductive lines as the second working sensing line, to adjust the position of the sensing area, wherein the first working sensing line and the second working sensing line are different; and
step C-2': detecting the conductor according to the adjusted sensing area.

8. The three-dimensional gesture sensing method according to claim 7, wherein, in the step C-1', a driving circuit of the touch sensing device is configured to maintain the area of the sensing area and to change the position of the sensing area.

9. The three-dimensional gesture sensing method according to claim 7, wherein the step C further comprises:
step C-3': switching off the second working sensing line as a not-working sensing line, driving at least one third conductive line of the conductive lines as the second working sensing line when the conductor is detected, to shrink the area of the sensing area; and
step C-4': adjusting the position of the sensing area, and detecting the conductor according to the shrunk sensing area.

10. The three-dimensional gesture sensing method according to claim 9, wherein step C further comprises:
step C-5': when again detecting the conductor, driving the conductive lines at one side of the center of all conductive lines as the first working sensing lines and driving the conductive lines at another side of the center of all conductive lines as the second working sensing lines, to continually detect the conductor; and
step C-6': determining which second working sensing lines detect a signal change, and accordingly obtaining a distance between the conductor and the touch sensing device;
wherein if the second working sensing line detecting the signal change is near the center of all conductive lines, the distance between the conductor and the touch sensing device is short.

11. The three-dimensional gesture sensing method according to claim 1, wherein the step C further comprises:
step C-1": decreasing the area of the first sensing area and maintaining the area of the other sensing areas when the conductor is detected in a first sensing area of the sensing areas formed between the conductive lines.

12. The three-dimensional gesture sensing method according to claim 1, wherein the step C further comprises:
step C-2": adjusting the area of all sensing areas to be equal to the area of the first sensing area, when the conductor has been detected in the first sensing area over a predetermined time.

13. The three-dimensional gesture sensing method according to claim 1, wherein the first working sensing line is a transmitting line and the second working sensing line is a receiving line.

14. A touch sensing device, used to dynamically adjust at least the area, the position or the amount of a sensing area for detecting a conductor, comprising:
a capacitive touch panel, comprising a plurality of conductive lines parallel with each other; and
a driving circuit, connected to the conductive lines, at the first timing, driving at least one first conductive line of the conductive lines as a first working sensing line and driving at least one second conductive line of the conductive lines as a second working sensing line, such that the sensing area is formed between the first working sensing line and the second working sensing line.

15. The touch sensing device according to claim 14, wherein, at a second timing, the driving circuit switches off the second conductive line as a not-working sensing line and drives at least one third conductive line of the conductive lines as the second working sensing line, to adjust the area of the sensing area.

16. The touch sensing device according to claim 15, wherein the not-working sensing line is floated, grounded or provided with a constant voltage.

17. The touch sensing device according to claim 15, wherein the distance between the third conductive line and the first conductive line is larger than the distance between the second conductive line and the first conductive line, such that the area of the sensing area is enlarged, and the touch sensing device continues to detect the conductor according to the enlarged sensing area.

18. The touch sensing device according to claim 15, wherein when the conductor is detected by the touch sensing device, the driving circuit switches off the second working sensing line as the not-working sensing line and drives at least one third conductive line of the conductive lines as the second working sensing line, wherein the distance between the third conductive line and the first conductive line is less than the distance between the second conductive line and the first conductive line, such that the area of the sensing area is shrunk and the couch sensing device detects the conductor according to the shrunk sensing area.

19. The touch sensing device according to claim 18,
wherein when the touch sensing device again detects the conductor, the driving circuit drives the conductive lines at one side of the center of all conductive lines as the first working sensing lines and drives the conductive lines at another side of the center of all conductive lines as the second working sensing lines, to continually detect the conductor; and
wherein the touch sensing device determines which second working sensing lines detect a signal change, and accordingly obtains a distance between the conductor and the touch sensing device, wherein if the second working sensing line detecting the signal change is near the center of all conductive lines, the distance between the conductor and the touch sensing device is short.

20. The touch sensing device according to claim 19,
wherein the driving circuit drives different conductive lines at one side of the center of all conductive lines as the first working sensing lines and correspondingly drives different conductive lines at another side of the center of all conductive lines as the second working sensing lines to form different sensing areas to detect the conductor, wherein the sensing areas are symmetrical with the center of all conductive lines and have different areas; and
wherein each sensing area corresponds to a height range for sensing, and one of the sensing areas senses the conductor at a sensing height within its corresponding height range.

21. The touch sensing device according to claim 20, wherein the driving circuit is configured to maintain the area of the sensing area and to change the position of the sensing area, and the touch sensing device continues to detect the conductor according to the sensing area controlled by the driving circuit.

22. The touch sensing device according to claim 21,
wherein when the touch sensing device again detects the conductor, the driving circuit drives the conductive lines at one side of the center of all conductive lines as the first working sensing lines and drives the conductive lines at another side of the center of all conductive lines as the second working sensing lines, to continually detect the conductor; and
wherein the touch sensing device determines which second working sensing lines detect a signal change, and accordingly obtains a distance between the conductor and the touch sensing device, wherein if the second working sensing line detecting the signal change is near the center of all conductive lines, the distance between the conductor and the touch sensing device is short.

23. The touch sensing device according to claim 22, wherein when the conductor has been detected in the first sensing area over a predetermined time, the driving circuit adjusts the area of each sensing area to be equal to the area of the first sensing area.

24. The touch sensing device according to claim 20, wherein the when the conductor is detected by the touch sensing device, the driving circuit switches off the second working sensing line as the not-working sensing line and drives at least one third conductive line of the conductive lines as the second working sensing line, to shrink the area of the sensing area, and the touch sensing device changes the position of the sensing area and detects the conductor according to the shrunk and displaced sensing area.

25. The touch sensing device according to claim 14, wherein, at a third timing, the driving circuit switches off the first working sensing line and the second working sensing line as two not-working sensing lines, drives at least one third conductive line of the conductive lines as the first working sensing line, and drives at least another one third conductive line of the conductive lines as the second working sensing line, to adjust the position of the sensing area, wherein the first working sensing line and the second working sensing line are different.

26. The touch sensing device according to claim 14, wherein the driving circuit controls the conductive lines to form a plurality of sensing areas, and when the conductor is detected in one first sensing area of the sensing areas, the driving circuit shrinks the area of the first sensing area and maintains the area of the other sensing areas.

27. The touch sensing device according to claim 14, wherein the first working sensing line is a transmitting line and the second working sensing line is a receiving line.

* * * * *